(12) United States Patent
Huang

(10) Patent No.: US 7,378,977 B2
(45) Date of Patent: May 27, 2008

(54) CURRENT OVERLOAD DETECTING SYSTEM AND METHOD

(75) Inventor: Kun-Hung Huang, Taipei (TW)

(73) Assignee: Inventec Corporation, Shih-Ling District (TW)

( * ) Notice: Subject to any disclaimer, the term of this patent is extended or adjusted under 35 U.S.C. 154(b) by 281 days.

(21) Appl. No.: 11/389,436

(22) Filed: Mar. 23, 2006

(65) Prior Publication Data

US 2007/0139838 A1 Jun. 21, 2007

(30) Foreign Application Priority Data

Dec. 15, 2005 (TW) .............................. 94144408 A

(51) Int. Cl.
*G08B 21/00* (2006.01)
(52) U.S. Cl. .................. 340/657; 340/664; 700/21; 702/64
(58) Field of Classification Search ................ 340/657, 340/661, 664, 3.43, 3.44; 700/21, 79; 702/57, 702/58, 64; 710/10, 15, 18, 313; 713/340, 713/2, 320
See application file for complete search history.

(56) References Cited

U.S. PATENT DOCUMENTS

| 5,115,226 | A | * | 5/1992 | Schweitzer, III | ............ | 340/664 |
|---|---|---|---|---|---|---|
| 5,136,458 | A | * | 8/1992 | Durivage, III | ............... | 702/58 |
| 6,104,304 | A | * | 8/2000 | Clark et al. | ................. | 340/664 |
| 6,298,370 | B1 | * | 10/2001 | Tang et al. | ................. | 718/102 |
| 6,414,505 | B1 | * | 7/2002 | Stauffer et al. | ............. | 324/761 |
| 6,586,849 | B2 | * | 7/2003 | Tarr | ........................... | 713/320 |
| 6,834,354 | B1 | * | 12/2004 | Togawa | ...................... | 713/320 |
| 6,968,465 | B2 | * | 11/2005 | Freevol et al. | ............. | 713/330 |
| 7,003,409 | B2 | * | 2/2006 | Hepner et al. | ............. | 340/664 |
| 2005/0223090 | A1 | * | 10/2005 | Ewing et al. | ............... | 713/340 |

* cited by examiner

*Primary Examiner*—John Tweel, Jr.
(74) *Attorney, Agent, or Firm*—Foly & Lardner LLP

(57) ABSTRACT

A current overload detecting system and method applicable in a data processing device connected with a plurality of electronic devices is disclosed, each of the electronic devices having a USB interface. The data processing device has a plurality of USB ports corresponding to and connected with the USB interfaces, a plurality of USB control units for controlling the operations of the USB ports, and a basic input/output system (BIOS) for executing a POST process. The current overload detecting system includes a signal-detecting unit for detecting if the USB control unit of the data processing device is outputting an over-current when the BIOS of the data processing device is executing the POST process, outputting a control signal if the USB control unit is detected to be outputting the over-current signal; and a display unit for receiving the control signal and displaying corresponding messages according to the control signal.

11 Claims, 2 Drawing Sheets

CURRENT OVERLOAD DETECTING SYSTEM AND METHOD

BACKGROUND OF THE INVENTION

1. Field of the Invention

Figure 1:
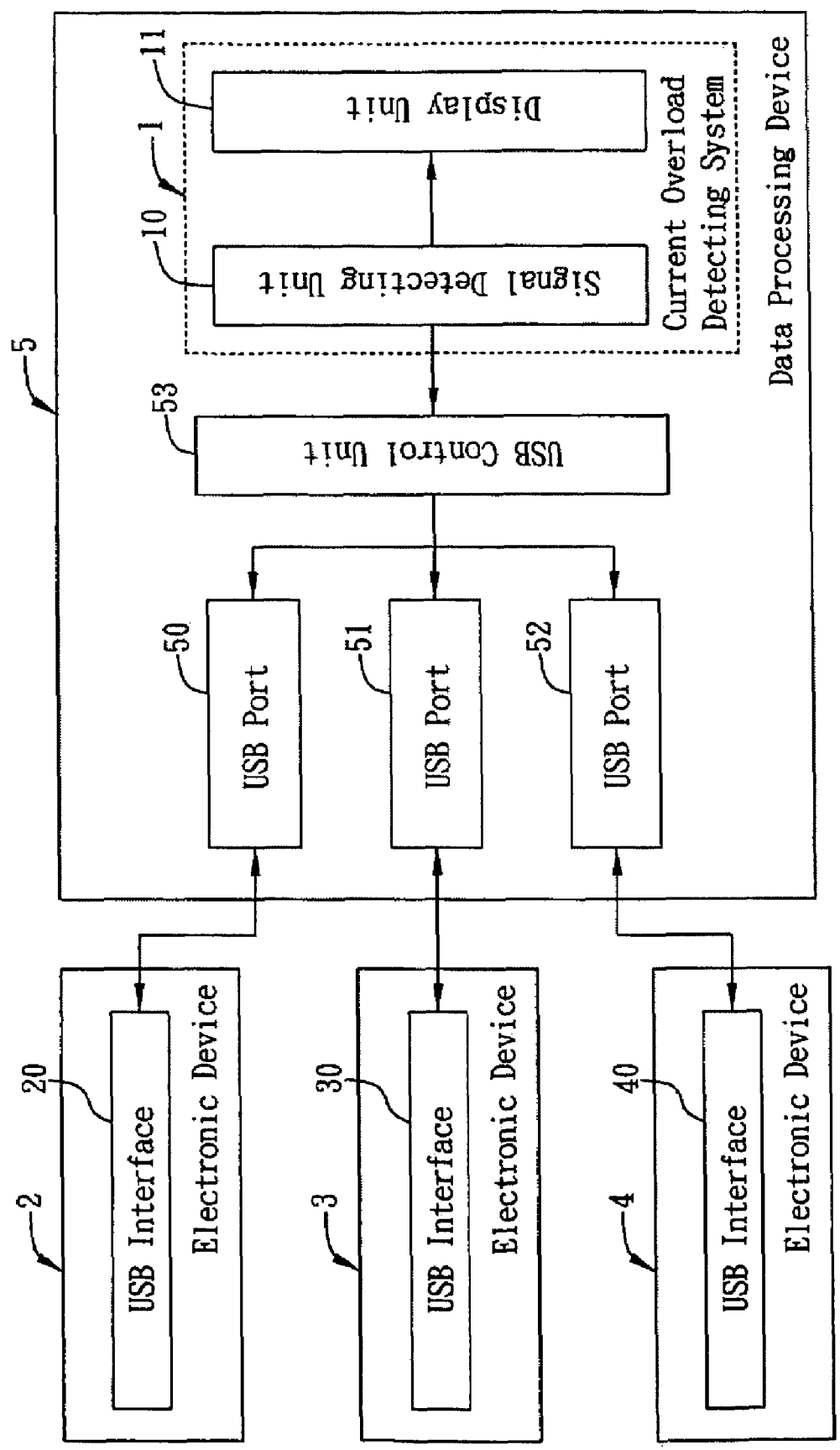

The present invention relates to a current overload detecting system and method and, more particularly, to a current overload detecting system and method applicable to a data processing device connected with a plurality of electronic devices, each of the electronic devices having a universal serial bus (USB) interface, the data processing device having a plurality of universal serial bus (USB) ports corresponding to and connected with the USB interfaces, a plurality of USB control units for controlling the operations of the USB ports, and a basic input/output system (BIOS) for executing a power-on self test (POST) process.

2. Description of Related Arts

Computer processors and the programs running on them need to connect to the outside world in order to gain input, display output, and otherwise control various devices. Accordingly, modern peripheral devices connected to computers typically adopt universal series bus (USB) interfaces for data transmission. The USB interface has, among other things, the advantage of high data transmission efficiency.

After the USB interfaces are connected with USB ports of the computer, power can be provided to electronic devices connected to the computer via the USB interfaces. In order to be connected with a plurality of electronic devices, each of which has a USB interface, a modern computer is provided with a plurality of USB ports, often 4 or 8. However, the USB chip installed in the computer for controlling the operation of the USB ports has a limit to the power it can provide. Therefore, if connected with too many electronic devices, the computer will encounter a power shortage problem and some of the electronic devices may be underpowered, especially when the computer is powered-on, which is during the same time that the basic input/output system (BIOS) of the computer is executing a power-on self test (POST) process.

When the computer is powered-on and the BIOS is executing the POST process, a user may think an electronic device having a USB interface has sufficient power for normal operation when such is not the case. However, if the BIOS is executing the POST process, the electronic device, which has the USB interface and is connected with the computer, has likely stopped working due to insufficient power (voltage or current) from the USB chip. Moreover, a user of the computer likely has no idea what's wrong with the computer nor knows how to manage subsequent processes.

Therefore, there is a significant need to provide a technical resolution capable of solving the problems of the prior art and allowing the user of the computer to know whether an electronic device, which has the USB interface, is underpowered at start-up.

SUMMARY OF THE INVENTION

In view of the above-mentioned problems of the prior art, it is a primary objective of the present invention to provide a current overload detecting system and method for detecting current overload.

It is another objective of the present invention to provide a current overload detecting system and method, allowing a user to manage subsequent processes easily.

To achieve the above-mentioned and other objectives, a current overload detecting system is provided according to the present invention. The current overload detecting system is applicable in a data processing device connected with a plurality of electronic devices, each of the electronic devices having a universal serial bus (USB) interface, the data processing device having a plurality of USB ports corresponding to and connected with the USB interfaces, a plurality of USB control units for controlling the operations of the USB ports, and a basic input/output system (BIOS) for executing a power-on self test (POST) process. The current overload detecting system includes a signal-detecting unit for detecting if the USB control unit of the data processing device is outputting an over-current when the BIOS of the data processing device is executing the POST process, outputting a control signal if the USB control unit is detected to output the over-current signal; and a display unit for receiving the control signal output by the signal-detecting unit, displaying corresponding messages according to the control signal, so as to inform a user in the situation that at least one of the electronic devices is current overloaded now.

A current overload detecting method corresponding to the above current overload detecting system is further disclosed. The current overload detecting method is also applicable in a data processing device connected with a plurality of electronic devices, each of the electronic devices having a USB interface, the data processing device having a plurality of USB ports corresponding to and connected with the USB interfaces, a plurality of USB control units for controlling the operations of the USB ports, and a BIOS for executing a POST process. The current overload detecting method includes continually checking whether the USB control unit of the data processing device is outputting an over-current when the BIOS of the data processing device is executing the POST process, and outputting a control signal if the USB control unit is detected to output the over-current signal, until the USB control unit is detected not to output the over-current signal; and displaying corresponding messages according to the control signal, so as to inform a user in the situation that at least one of the electronic devices is presently underpowered.

In contrast to the prior art, the current overload detecting system and method of the present invention is designed to achieve the primary and other objectives by the interacting operations of the signal-detecting unit and the display unit.

BRIEF DESCRIPTIONS OF THE DRAWINGS

Figure 2:
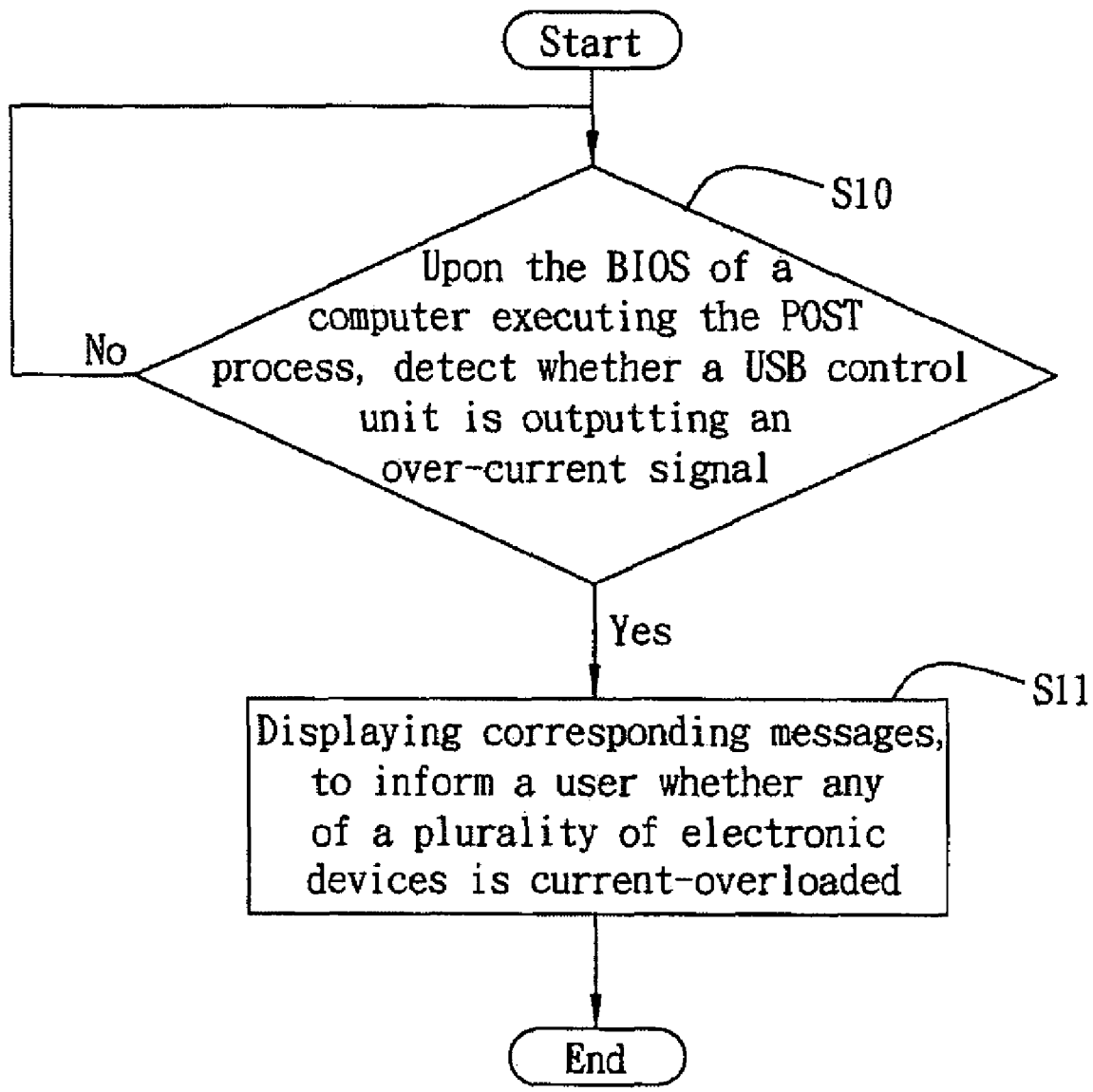

FIG. 1 is a block diagram of a plurality of electronic devices and a data processing device connected with all of the electronic devices and having the current overload detecting system of the preferred embodiment according to the present invention; and FIG. 2 is a flow chart of a current overload detecting method corresponding to the current overload detecting system shown in FIG. 1.

DETAILED DESCRIPTIONS OF PREFERRED EMBODIMENTS

The following illustrative embodiments are provided to illustrate the disclosure of the present invention, these and other advantages and effects being readily understandable by those in the art after reading the disclosure of this specification. The present invention can also be performed or applied by other, differing embodiments. The details of the specification may be varied on the basis of different viewpoints and applications, and numerous modifications and variations can be devised without departing from the spirit of the present invention.

FIG. 1 is a block diagram of a plurality of electronic devices 2, 3 and 4 and a data processing device 5 connected with all of the electronic devices 2, 3 and 4 and having a current overload detecting system 1 of the preferred embodiment according to the present invention. The current overload detecting system 1 is applicable in the data processing device 5, which comprises a basic input/output system (BIOS) for executing a power-on self test (POST) process, a plurality of universal series bus (USB) ports 50, 51 and 52 connected with a plurality of USB interfaces 20, 30, and 40 of the electronic devices 2, 3, and 4, respectively, and a USB control unit 53 for controlling the operations of the USB ports 50, 51, and 52.

According to the preferred embodiment, the USB control unit 53 is a USB control chip, and the data processing device 5 is a desktop computer (DT), a pocket personal computer (PPC), a notebook computer (NB), a server, or a super computer.

The current overload detecting system 1 of the present invention comprises a signal-detecting unit 10 and a display unit 11, both of which will be described in detail in the following paragraphs.

The signal-detecting unit 10 is used to detect if the USB control unit 53 of the data processing device 5 is outputting an over-current signal used for indicating that the data processing device 5 is presently current overloaded. If the USB control unit 53 is detected to be outputting the over-current signal, the signal-detecting unit 10 outputs a control signal. According to the preferred embodiment, the signal-detecting unit 10 determines if the USB control unit 53 of the data processing device 5 is outputting the over-current signal by detecting an over-current signal output. In other words, during an overload, the condition of the USB control unit 53 of the data processing device 5 outputting the over-current signal when the BIOS is executing the POST process represents that one of the electronic devices 2, 3 and 4, such as electronic device 2, connected with the data processing device 5 cannot function normally. Without notification, a user of the electronic device 2 would likely not have any idea what is wrong with the electronic device 2. However, the signal-detecting unit 10 can then output the control signal such as a system management interrupt (SMI) signal in accordance with the over-current signal to alert a user.

The display unit 11 is used to receive the control signal output by the signal-detecting unit 10, and display corresponding messages in accordance with the control signal. Therefore, the user of the electronic device 2 is informed that the electronic device 2 is presently current overloaded. In other words, if receiving the control signal output by the signal-detecting unit 10, the display unit 11 will generate in accordance with the control signal various corresponding messages to inform the user of the electronic device 2 that, for example, the electronic device 2 is not functioning normally, the electronic device 2 is not presently connected with the data processing device 5, or the electronic device 2 is short of power. The user can, therefore, for example, disconnect one or two of the electronic devices 2, 3 and 4 from the data processing device 5, or actuate a power source for the electronic device 2. According to the present invention, the display unit 11 is, but not limited to, a display of the data processing device 5. The display unit 11 is, for example, a plug-in electronic component such as a light emitting diode (LED), a seven-segment display, an organic light emitting diode (OLED) display, a plasma display, or a liquid crystal (LCD) display.

Moreover, according to the preferred embodiment the power of the current overload detecting system 1 is provided by, but not limited to, the data processing device 5 or a power module externally connected to the current overload detecting system 1.

In accordance with the current overload detecting system 1, the present invention further discloses a current overload detecting method. Please refer to FIG. 2, which is a flow chart of the current overload detecting method. The current overload detecting method is also applicable to a data processing device connected to a plurality of electronic devices. Each of the electronic devices has a USB interface. The data processing device comprises a plurality of USB ports connected to the USB interfaces of the electronic devices respectively, and a USB control unit for controlling the operation of the USB ports. The data processing device further comprises the BIOS for executing the POST process. The current overload detecting method starts in step In step S10, when the BIOS of the data processing device is executing the POST process, the USB control unit of the data processing device is checked to determine whether it is outputting the over-current signal. If the USB control unit is detected to be outputting the over-current signal, then the current overload detecting method proceeds to step S11, otherwise, it iterates back to step S10.

In step S11, corresponding messages are displayed. Therefore, a user of one of the electronic devices is informed that the electronic device is presently not functioning properly. Note that all of the steps of the current overload detection method have been disclosed in the current overload detecting system, further description hereby being omitted in the description of the method.

In summary, the current overload detecting system and method of the present invention utilizes the signal-detecting unit to detect if the USB control unit of the data processing device is outputting the over-current signal when the BIOS of the data processing device is executing the POST process. If the USB control unit is detected to output the over-current signal, the control signal is output to the display unit, and the display unit, after receiving the control signal, displays corresponding messages in accordance with the control signal. Therefore, a user of one of the electronic devices is informed that the electronic device is presently current overloaded or otherwise not functioning properly, so as to achieve the objective of detecting a current overload and informing a user of the necessity for a subsequent management process.

The foregoing descriptions of the detailed embodiments are illustrated to disclose the features and functions of the present invention and are not restrictive of the scope of the present invention. It should be understood by those in the art that various modifications and variations may be made to the present invention that fall under the spirit and principle of the invention as described in this disclosure and the scope as described in the appended claims.

What is claimed is:

1. A current overload detecting system applicable in a data processing device connected with a plurality of electronic devices, wherein each of the electronic devices having a universal serial bus (USB) interface, and wherein the data processing device having a plurality of USB ports corresponding to and connected with the USB interfaces, a plurality of USB control units for controlling the operation of the USB ports, and a basic input/output system (BIOS) for executing a power-on self test (POST) process, the current overload detecting system comprising:
- a signal-detecting unit for detecting whether the USB control unit of the data processing device outputs an over-current signal when the BIOS of the data processing device executes the POST process, and for outputting a control signal in the case that the USB control unit is detected to have output the over-current signal; and
- a display unit for receiving the control signal output by the signal-detecting unit and displaying corresponding messages according to the received control signal, so as to inform a user that at least one of the electronic devices is detected to be currently in a current overload status.

2. The current overload detecting system of claim 1, wherein the USB control unit is a USB chip.

3. The current overload detecting system of claim 1, wherein the data processing device is selected from the group consisting of a desktop computer (DT), a pocket personal computer (PPC), a notebook computer (NB), a server, and a super computer.

4. The current overload detecting system of claim 1, wherein the signal-detecting unit determines if the USB control unit of the data processing device is outputting the over-current signal by detecting an over-current signal terminal of the USB control unit of the data processing device.

5. The current overload detecting system of claim 1, wherein the control signal is a system management interrupt (SMI) signal.

6. The current overload detecting system of claim 1, wherein the display unit is a plug-in electronic component.

7. The current overload detecting system of claim 6, wherein the electronic component is selected from the group consisting of a light emitting diode (LED), a seven-segment display, an organic light emitting diode (OLED), a plasma display, and a liquid crystal display (LCD).

8. The current overload detecting system of claim 1, wherein the display unit is a display of the data processing device.

9. The current overload detecting system of claim 1, further comprising a power source provided by the data processing device.

10. The current overload detecting system of claim 1, further comprising a power source provided by a power module.

11. A current overload detecting method applicable in a data processing device connected with a plurality of electronic devices, wherein each of the electronic devices having a USB interface, and wherein the data processing device having a plurality of USB ports corresponding to and connected with the USB interfaces, a plurality of USB control units for controlling the operations of the USB ports, and a BIOS for executing a POST process, the current overload detecting method comprising:
- continuously monitoring to check if the USB control unit of the data processing device outputs an over-current signal when the BIOS of the data processing device executes the POST process, then outputting a control signal if the USB control unit is detected to be outputting the over-current signal, until the USB control unit is detected to cease be outputting the over-current signal; and
- displaying corresponding messages according to the control signal, so as to inform a user that at least one of the electronic devices is presently in a current overload status.

* * * * *